US005789896A

United States Patent [19]
Fischer et al.

[11] Patent Number: 5,789,896
[45] Date of Patent: Aug. 4, 1998

[54] APPARATUS AND METHOD FOR CONTROLLING AN ELECTRIC MOTOR HAVING AN ARMATURE AND A SERIES-WOUND, SERIES-CONNECTED FIELD COIL THAT CAN BE SEPARATELY CONTROLLED DURING REGENERATIVE BRAKING

[76] Inventors: George A. Fischer, 413 Oakland Ave., Grove City, Pa. 16127; Dennis A. Jarc, 12435 Pearl Rd., Chardon, Ohio 44024

[21] Appl. No.: 779,856

[22] Filed: Jan. 3, 1997

[51] Int. Cl.[6] ........................ H02P 3/18
[52] U.S. Cl. .............. 318/759; 318/376; 318/378; 318/139
[58] Field of Search ................ 318/759, 376, 318/378, 139

[56] References Cited

U.S. PATENT DOCUMENTS

| | | | |
|---|---|---|---|
| 3,866,098 | 2/1975 | Weiser | 318/251 |
| 4,267,492 | 5/1981 | Manners | 318/376 |
| 4,275,341 | 6/1981 | Huber et al. | 318/376 |
| 4,330,742 | 5/1982 | Reimers | 320/14 |
| 4,384,240 | 5/1983 | Sloan | 318/255 |
| 4,388,573 | 6/1983 | Horiuchi et al. | 318/376 |
| 4,401,927 | 8/1983 | Thuy | 318/379 |
| 4,427,928 | 1/1984 | Kuriyama et al. | 318/139 |
| 4,894,553 | 1/1990 | Kaneyuki | 318/759 X |
| 5,136,219 | 8/1992 | Takahashi et al. | 318/139 |
| 5,608,616 | 3/1997 | Umeda et al. | 318/759 X |

OTHER PUBLICATIONS

R. A. Hill and J. J. Sartaine, *The Use of AC/DC Regenerative Drives On Continuous Miners And Shuttlecars*, Mar., 1986, Society of Mining Engineers of AIME, New Orleans, Louisiana.

*Primary Examiner*—Karen Masih
*Attorney, Agent, or Firm*—Kirkpatrick & Lockhart LLP

[57] ABSTRACT

A circuit for controlling a motor having an armature and a series-wound, series-connected field coil that can be separately controlled during regenerative braking. The circuit includes a main switching circuit, an armature circuit, and a field circuit. The main switching circuit includes a first switch and a first diode parallel-connected to the first switch. The armature circuit includes a second switch parallel-connected to the armature and series-connected to the main switching circuit, and includes a second diode parallel-connected to the second switch. The field circuit includes a third diode parallel-connected to the field coil and series-connected to the armature circuit.

8 Claims, 5 Drawing Sheets

APPARATUS AND METHOD FOR CONTROLLING AN ELECTRIC MOTOR HAVING AN ARMATURE AND A SERIES-WOUND, SERIES-CONNECTED FIELD COIL THAT CAN BE SEPARATELY CONTROLLED DURING REGENERATIVE BRAKING

BACKGROUND OF THE INVENTION

1. Field of the Invention

The present invention is directed to an apparatus and method for controlling an electric motor having an armature and a series-wound, series-connected field coil that is separately controlled during regenerative braking. In particular, the present invention is directed to an apparatus using a minimum number of components, and an associated method for controlling the motor.

2. Description of the Background

In many industries, such as underground mining, batteries are the primary source of power, and electric motors are used to move vehicles and equipment. Electric motors may have several modes of operation. For example, one mode of operation is known as "motoring" and it causes the motor to propel a vehicle. Another mode of operation, known as "regenerative braking", converts kinetic energy of the vehicle into electricity to recharge the battery. Although other modes of operation may be used, motoring and regenerative braking are the most common modes of operation used with electric motors. Regardless of the modes of operation used, power circuits are typically required to operate the motors.

Different types of motors offer different advantages and disadvantages for motoring and regenerative braking. For example, series-wound direct current motors are well suited to motoring because they offer high torque at low speed, a wide speed variation, and they require minimal circuitry and control. Another advantage of series-wound motors is that inductance of an electromagnetic field generated by the motor's field coil acts as a choke to improve commutation, and thereby reduces brush wear, when the armature of the motor is subjected to "current ripple". Current ripple is common, and it is caused when solid state devices are used to regulate power. A disadvantage of series-wound motors is that they do not allow for well-controlled regenerative braking. Another disadvantage of series-wound motors is that regenerative braking using those motors has not been practical in underground mining because of the cost and size of the control system required. In contrast, separately excited motors allow for very well-controlled regenerative braking because the field coil can be excited separately from the armature. A disadvantage of separately excited motors, however, is that they have inferior motoring performance and brush life.

The significant deficiencies of both series-wound and separately excited motors have led some electric vehicle designers to use alternative drive systems, such as variable frequency, brushless direct current, and variable reluctance. Those systems are expensive and complex. Furthermore, when those systems are used with vehicles having more than one drive motor, which is often the case with underground mining vehicles, it is often difficult to compensate for variations in speed between the drive motors. Such variation may be caused, for example, when the vehicle goes around a bend and one drive motor is on the outside and another drive motor is on the inside. It may also be caused by variations in traction, such as when one wheel slips more than another. As a result, complex controls are typically required for those systems to prevent excessive wheel slippage and to provide maximum traction.

Thus, the need exists for a simple power circuit that can be used with a single motor to provide the benefits of both separately excited motors and series-wound motors, without the use of complex control systems.

SUMMARY OF THE INVENTION

The present invention is directed to a circuit for controlling a motor having an armature and a series-wound, series-connected field coil that can be separately controlled during regenerative braking. The present invention includes a main switching circuit, an armature circuit, and a field circuit. The main switching circuit includes a first switch and a first diode parallel-connected to the first switch. The armature circuit includes a second switch parallel-connected to the armature and series-connected to the main switching circuit, and includes a second diode parallel-connected to the second switch. The field circuit includes a third diode parallel-connected to the field coil and series-connected to the armature circuit.

The present invention also includes a method of performing regenerative braking with the power circuit 36. The method is described in more detail hereinabove, and it includes the steps of forming a first current path including the positive terminal 56 of the battery 54, the field coil 14, and the negative terminal 58 of the battery 54; disconnecting the first current path; forming a second current path including the field coil 14 and excluding both the armature 16 and the battery 54 for recirculating current flowing through the field coil 14; forming a third current path excluding the battery 54 and the field coil 14 for recirculating current generated by the armature 16; disconnecting the third current path; and forming a fourth current path including the negative terminal 58 of the battery 54, the armature 16, and the positive terminal 56 of the power source 54, and excluding the field coil 14, for providing power to the battery 54 during regenerative braking. The step of disconnecting the first circuit is preferably performed when a predetermined current exists in the field coil 14. Alternatively, the step of disconnecting the first circuit may be performed after a predetermined period of time. The step of disconnecting the third circuit is preferably performed when a predetermined current exists in the armature 16.

The invention solves the above-mentioned shortcomings in the prior art by providing a circuit that provides the benefits of both separately excited and series-wound motors, and which does not require complex control systems. The present invention is small, simple, and reliable, making it a cost effective alternative to the prior art systems.

BRIEF DESCRIPTION OF THE DRAWINGS

For the present invention to be clearly understood and readily practiced, the present invention will be described in conjunction with the following figures, wherein.

DESCRIPTION OF THE PREFERRED EMBODIMENTS

It is to be understood that the figures and descriptions have been simplified to illustrate only those aspects relevant for a clear understanding of the present invention, while eliminating, for the purpose of clarity, other elements. Those of ordinary skill in the art will recognize that other elements may be required and/or desirable. In addition, well known devices, such as speed input devices, direction input devices, and analog-to-digital converters, are not described in detail because such devices are well known in the art, and because they do not further aid in the understanding of the present invention. The present invention will be described in terms of its preferred embodiment, an underground mining vehicle, although other applications of the present invention are contemplated.

Figure 1:
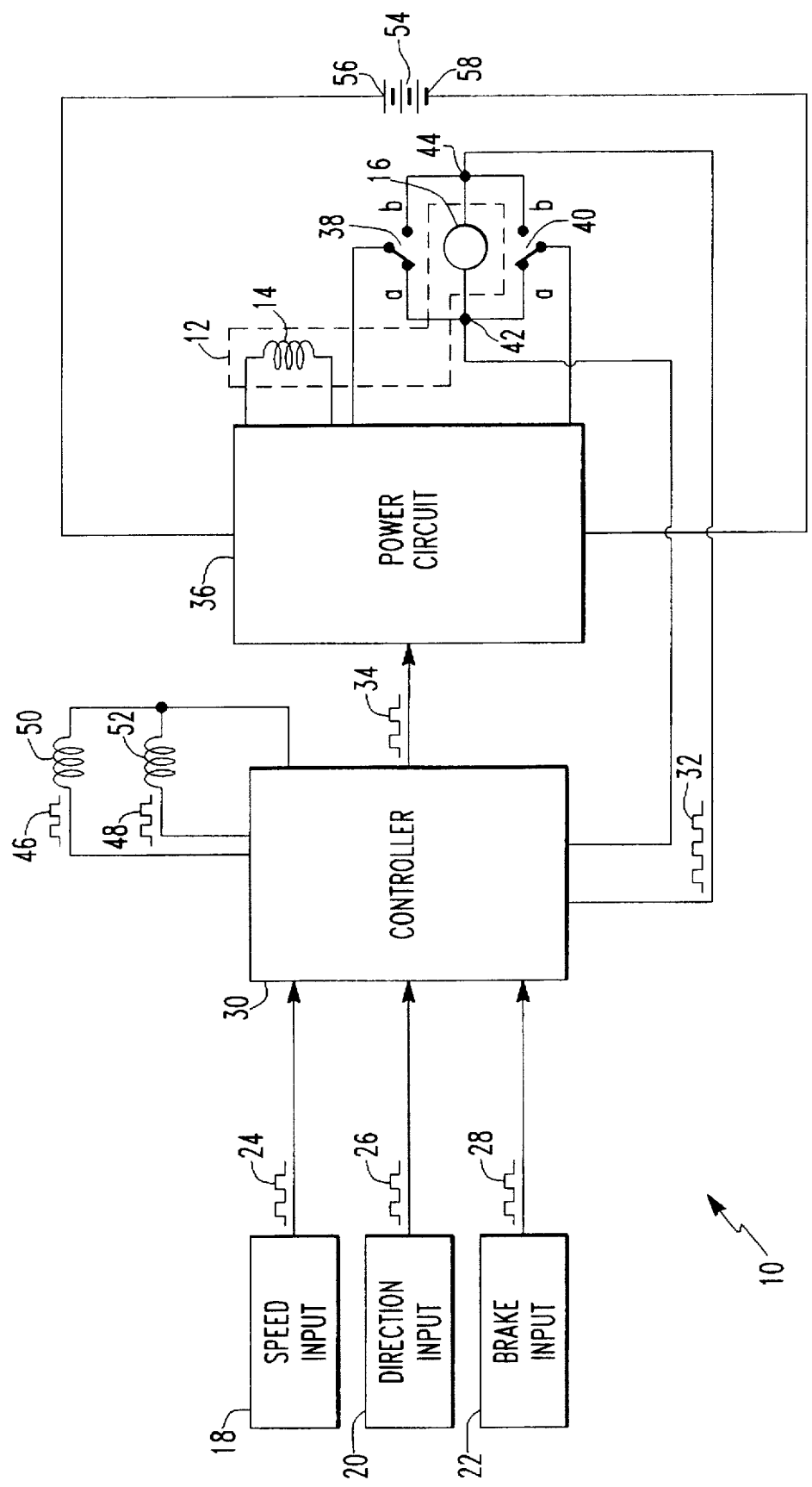
FIG. 1 is a combination block diagram and circuit schematic of a control system constructed in accordance with the present invention.

FIG. 1 is a combination block diagram and circuit schematic illustrating a motor control system 10 constructed in accordance with the present invention. The control system 10 controls a series-wound, series-connected, direct current motor 12 having a field coil 14 and an armature 16.

Speed, direction, and braking commands are provided by an operator and are received by the system 10 through a speed input 18, a direction input 20, and a brake input 22, respectively. The speed input 18 produces a first signal 24 indicative of the desired speed indicated by the operator. The direction input 20 produces a second signal 26 indicative of the desired direction indicated by the operator. The brake input 22 produces a third signal 28 indicative of the desired braking indicated by the operator. Those inputs 18, 20, 22 are preferably constructed as is well known in the art of underground traction vehicles. For example, the speed input 18 may be a pedal located on the floor of the vehicle, much like an accelerator pedal in an automobile, the direction input 20 may be a switch having a "forward" position and a "reverse" position, and the brake input 22 may be a pedal located on the floor of the vehicle, much like a brake pedal in an automobile.

A controller 30 receives the signals from the speed, direction, and brake inputs 18, 20, 22, and receives a fourth signal 32 from the armature 16 indicative of the actual speed and direction of the vehicle. The controller 30 determines which mode of operation, or combinations of modes, will achieve the speed, direction, and braking desired by the operator, and produces control signals 34 for controlling the mode of operation of the motor 12. In the preferred embodiment, the controller 30 produces several signals that are collectively referred to as control signal 34. The controller 30 may also receive signals indicative of the current through the field coil 14 and the current through the armature 16. Those signals may be used to provide feedback to facilitate smooth ramping of power during motoring, to provide feedback to guard against overcurrent situations during regenerative braking, and to provide feedback to precisely control current through the field coil 14.

In the preferred embodiment, the controller 30 determines the speed and direction of the vehicle by causing the field coil 14 to be excited and monitoring the magnitude and polarity of the signal 32 generated by the armature 16. The armature 16 generates the signal 32 when a voltage is applied to the field coil 14 and the armature 16 is spinning. The magnitude of the signal 32 is indicative of the speed that the armature 16 is spinning, and the polarity of the signal 32 is indicative of the direction in which the armature 16 is spinning. In an alternative embodiment, the speed and direction of the vehicle are determined with sensors (not shown) placed on the wheels of the vehicle, as is known in the prior art.

The controller 30 is preferably a microprocessor that receives the first, second, and third signals 24, 26, 28 from the speed, direction, and brake inputs 18, 20, 22, respectively, through analog-to-digital converter ports. The controller 30 also receives the fourth signal 32 indicative of the speed and direction of the vehicle, and signals (not shown) indicative of the current through the field coil 14 and the current through the armature 16, through analog-to-digital converter ports.

A power circuit 36 is responsive to the control signals 34 from the controller 30 and operates the motor 12. The operation of the power circuit 36 will be described in more detail hereinbelow with reference to FIG. 2.

First and second contactors 38, 40 selectively connect the power circuit 36 to first and second terminals 42, 44 of the armature 16 and control whether the motor 12 will drive the vehicle in a forward direction, drive the vehicle in a reverse direction, or use the armature in a "tach model" which is described in more detail hereinbelow. Each of the contactors 38, 40 may be placed in either position "a" or position "b". In the preferred embodiment, position "a" is a normally closed position and position "b" is a normally open position. When the first contactor 38 is in position "a", the second contactor 40 is in position "b", and power is applied to the motor 12, the motor 12 will drive the vehicle in the forward direction. Alternatively, when the first contactor 38 is in position "b", the second contactor 40 is in position "a", and power is applied to the motor 12, the motor 12 will drive the vehicle in the reverse direction. If the first and second contactors 38, 40 are both in position "a", then the armature 16 is being used in the tach mode and it will not drive the vehicle because the current will be shorted around the armature 16. In the preferred embodiment, the first and second contactors 38, 40 are relays controlled with signals 46, 48 to relay coils 50, 52 from the controller 30.

A battery 54, having a positive terminal 56 and a negative terminal 58, serves as a power source and provides power, via the power circuit 36, to the motor 12. In the preferred embodiment, the battery 54 is composed of one hundred and twenty cells and produces approximately two hundred and forty volts.

Figure 2:
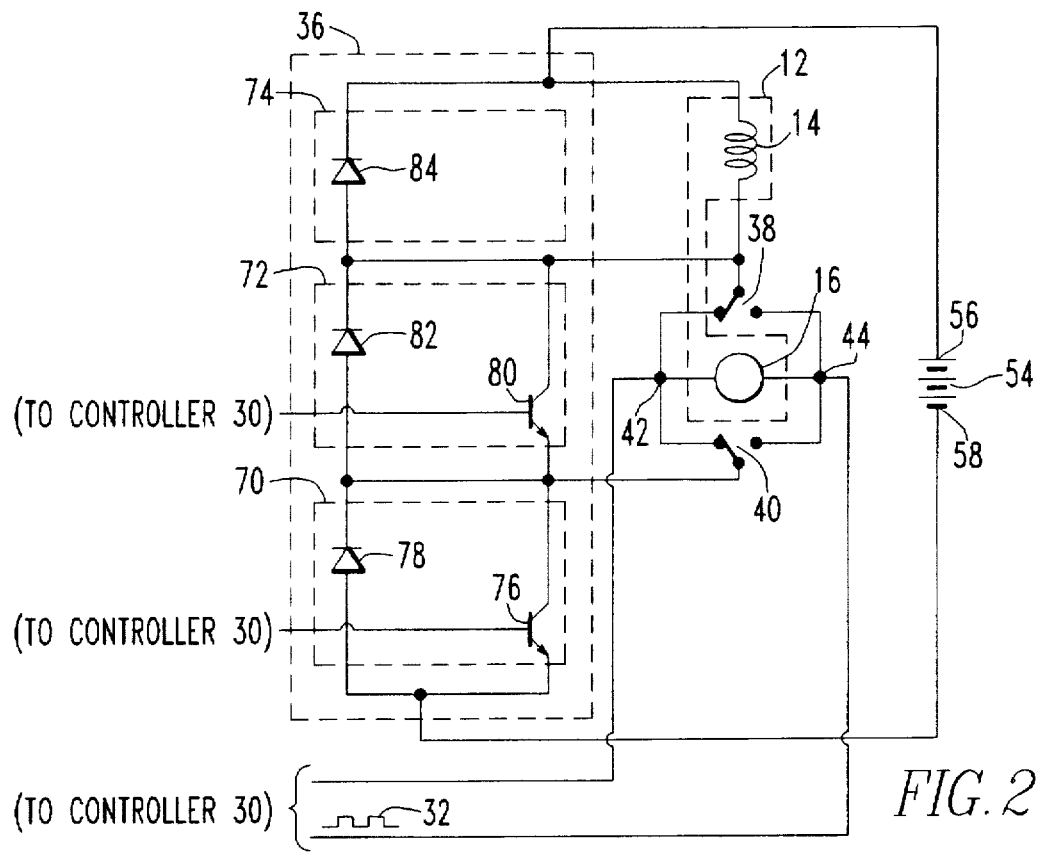
FIG. 2 is a circuit schematic of a preferred embodiment of a power circuit illustrated in FIG. 1.

FIG. 2 is a schematic diagram of the power circuit 36 illustrated in FIG. 1. To facilitate the description of the present invention, FIG. 2 also illustrates the field coil 14, the armature 16, the contactors 38, 40, and the battery 54, although those components are not part of the power circuit 36.

The power circuit 36 includes a main switching circuit 70, an armature circuit 72, and a field circuit 74. The main switching circuit 70 includes a first switch 76 and a first diode 78 parallel-connected to the first switch 76. The armature circuit 72 includes a second switch 80 parallel-connected to the armature 16. The armature circuit 72 also includes a second diode 82 parallel-connected to the second switch 80. The field circuit 74 includes a third diode 84 parallel-connected to the field coil 14.

In the preferred embodiment, the first and second switches 76, 80 are insulated gate bi-polar transistors ("IGBT"), and the controller 30 provides signals to base terminals of the IGBTs to control them. The first and second switches 76, 80, however, may be constructed from other solid state devices, such as gate turnoff thyristors ("IGTO") and MOS controlled thyristors ("MCT").

The operation of the present invention will now be described. As illustrated in FIG. 1, the controller 30 receives first, second, and third signals 24, 26, 28 from the speed, direction, and brake inputs 18, 20, 22, respectively. The controller 30 also receives the fourth signal 32 from the armature 16 indicative of the actual speed and direction of the vehicle. Those signals 24, 26, 28, 32 are used by the controller 30 to determine the operating mode, or sequence of operating modes, that must be performed. The controller 30 then sends appropriate control signals 34, 46, 48 to the power circuit 36 and to the first and second relay coils 50, 52, respectively. The power circuit 36 of the present invention preferably operates in three modes, motoring mode, regenerative braking mode, and tach mode. Operation of the power circuit 36 in each mode is described below.

The motoring mode will be described with reference to FIG. 2. In motoring mode, the motor 12 is used to drive the vehicle in either the forward or the reverse direction. When motoring mode is to be entered, the power circuit 36 receives control signals for the first and second switches 76, 80. In the preferred embodiment, those signals directly control the first and second switches 76, 80. Motoring mode has two steps. In the first step, the motor 12 is driving the vehicle, the first switch 76 is on, the second switch 80 is off, and a current path is formed within the power circuit 36. Current flows from the positive terminal 56 of the battery 54, through the field coil 14, through the first contactor 38, through the armature 16, through the second contactor 40, through the first switch 76, and to the negative terminal 58 of the battery 54. In the first step the motor 12 is driving the vehicle.

In the second step of motoring mode, the first switch 76 is turned off and there are two current paths formed. The first current path circulates through the power circuit 36 along a path from the field coil 14, through the third diode 84 and back to the field coil 14. The second current path circulates from the armature 16, through the second contactor 40, through the second diode 82, through the first contactor 38, and back to the armature 16.

The speed of the motor 12 during motoring mode is controlled by the first switch 76, also known as a "chopper". In the preferred embodiment the first switch 76 is turned on and off at a frequency of at least approximately five hundred hertz. When the first switch 76 is turned on the circuit 36 is in the first step of motoring mode, and when the first switch 76 is turned off the circuit 36 is in second step of motoring mode. The duty cycle of the first switch 76, that is the percentage of the time that the switch 76 is on, is regulated to control the average voltage across the armature 16, and thereby to control the speed. The more time that the first switch 76 is turned off, the lower the average voltage will be, and the speed of the vehicle can be expected to decrease.

The preferred embodiment also operates in a regenerative braking mode. In that mode, the field coil 14 is separately excited and the current through the armature 16 is regulated to control braking torque and to recharge the battery 54. Regenerative braking in the present invention has three steps.

In the first step, the first and second switches 76, 80 are both on, and two current paths are formed. A first current path flows from the positive terminal 56 of the battery 54 through the field coil 14, through the second switch 80, through the first switch 76, and to the negative terminal 58 of the battery 56. That current path excites the field coil 14. A second current path is generated by energy in the spinning armature 16 and circulates from the armature 16, through the first contactor 38, through the second switch 80, through the second contactor 40, and back to the armature 16.

In the second step of the regenerative braking mode, the second switch 80 remains on but the first switch 76 is turned off. Once again, there are two current paths. A first current path circulates from the field coil 14, through the third diode 84, and back to the field coil 14. That current path is a slowly decaying current loop that continues to excite the field coil 14 to maintain the electromagnetic field set up in the first step. A second current path is identical to the second current path in the first step of the regenerative braking mode. In other words, current circulates from the armature 16, through the first contactor 38, through the second switch 80, through the second contactor 40, and back to the armature 16. The current in the second current path is driven by the armature 16, will eventually be used to recharge the battery 54, and increases with the time spent in the second step.

In the third step of the regenerative braking mode, both the first and the second switches 76, 80 are off. Once again there are two current paths. The first is the same as the first current path in the second step of the regenerative braking mode. More specifically, a current loop circulates from the field coil 14, through the third diode 84, and back to the field coil 14. That current path is a slowly decaying current loop that continues to excite the field coil 14 to maintain the electromagnetic field set up in the first step. A second current path provides the actual regenerative braking wherein the vehicle is slowed and the battery 54 is recharged. The path is from the negative terminal 58 of the battery 54 to the first diode 78, through the second contactor 40, through the armature 16, through the first contactor 38, through the third diode 84, and to the positive terminal 56 of the battery 54.

The three steps of the regenerative braking mode are performed in sequential order, from step one to step two to step three, and then returning to step one. That process is repeated as long as the power circuit 36 is in regenerative braking mode. Step one excites the field coil 14. Steps one and two control the amplitude of the current flowing through the armature 16 prior to regenerative braking. Step three performs the recharging of the battery 54 and braking of the motor 12. The amount of braking and recharging is controlled by the current flowing through the armature 16 and into the battery 54. That current is controlled by the amount of time that the regenerative braking mode spends in steps one and two relative to the amount of time spent in step three.

The regenerative braking mode proceeds from the first step to the second step after a predetermined current is flowing through the field coil 14, or after a predetermined period of time has elapsed. In the preferred embodiment, the first step of regenerative braking has a duty cycle of between approximately two percent and approximately three percent. Step two increases the armature current. Step three converts the armature current generated during steps one and two into regenerative braking. The duration of the second and third steps typically depends on the degree of braking desired by the operator. For example, if more braking is desired, the power circuit 36 remains in steps one and two for more time and step three for less time. In contrast, if less braking is desired, the power circuit 36 remains in steps one and two for less time and step three for more time. The amount of time spent in each step is controlled by the controller 30, based on the braking input. The power circuit 36, however, cannot remain in the third step indefinitely because the electromagnetic field generated by exciting the field coil 14 decays over time and must occasionally be excited. In the preferred embodiment, the regenerative braking mode cycles through all three steps at least approximately five hundred times per second.

Returning to FIG. 1, the present invention also includes a tach mode. The tach mode determines the speed and direction of the vehicle. That information is used by the controller 30 to determine which mode or modes of operation are required to achieve the speed and direction requested by the operator. The speed and direction of the vehicle are determined by measuring the magnitude and polarity of the signal 32 generated by the armature 16 when the field coil 14 is excited and the armature 16 is spinning. The amplitude of the signal 32 is indicative of the speed of the vehicle, and the polarity of the signal 32 is indicative of the direction that the vehicle is moving. Of course, if the armature 16 is not spinning the signal 32 will have zero amplitude and no polarity, indicating that the armature 16, and the vehicle, is not moving.

The tach mode occurs in two steps. In the first step, both the first and second switches 76, 80 are turned on. The current path is formed from the positive terminal 56 of the battery 54 through the field coil 14, through the second switch 80, through the first switch 76, and to the negative terminal 58 of the battery 54. This current path excites the field coil 14.

In the second step, both the first and second switches 76, 80 are off. A circulating current path is formed from the field coil 14, through the third diode 84, and back to the field coil 14. During the second step the signal 32 is generated by the armature 16, and that signal 32 is measured by the controller 30 when the first and second contactors 38, 40 are in position "a", thereby allowing the armature 16 to be an open circuit generator. The voltage across the first and second terminals 42, 44 of the armature 16 forms the fourth signal 32 and is directly proportional to the speed of the armature 16.

The purpose of the first step is to excite the field coil 14. That results in a slowly decaying current loop through the field coil 14 during the second step. The tach mode proceeds from the first step to the second step after a predetermined current is flowing through the field coil 14, or after a predetermined period of time has elapsed. In the preferred embodiment, the first step lasts for a duty cycle between approximately two percent and approximately three percent. The tach mode preferably enters both the first and second steps at a rate of at least approximately five hundred times per second.

In the preferred embodiment, the tach mode is entered each time that an input, such as speed, direction, and braking, is received. The controller 30 compares the speed and direction of the vehicle, as determined in the tach mode, with the desired speed, direction, and braking, as provided by the speed, direction, and braking inputs 18, 20, 22. The controller 30 determines what action needs to be taken to achieve the desired speed, direction, and braking. For example, if the vehicle is stopped and speed and direction inputs are received, the controller 30 will set the first and second contactors 38, 40 in the appropriate positions for the desired direction and enter motoring mode to achieve the desired speed. If the vehicle is traveling and the desired speed is reduced below the present speed, regenerative braking mode is entered until the actual speed equals the desired speed. If the vehicle is moving and the operator selects to proceed in the opposite direction, regenerative braking is used to slow the vehicle, the contactors 38, 40 are switched to change direction, and then motoring mode is entered to achieve the desired speed. If the vehicle is moving and a complete stop is desired, regenerative braking mode is entered until the vehicle is stopped. In the preferred embodiment, it is recognized that regenerative braking does not work very well at very low speeds. Accordingly, conventional friction brakes supplement the regenerative braking system, and whenever the speed of the vehicle is below a predetermined value, the friction brakes are used to completely stop the vehicle.

Figure 3:
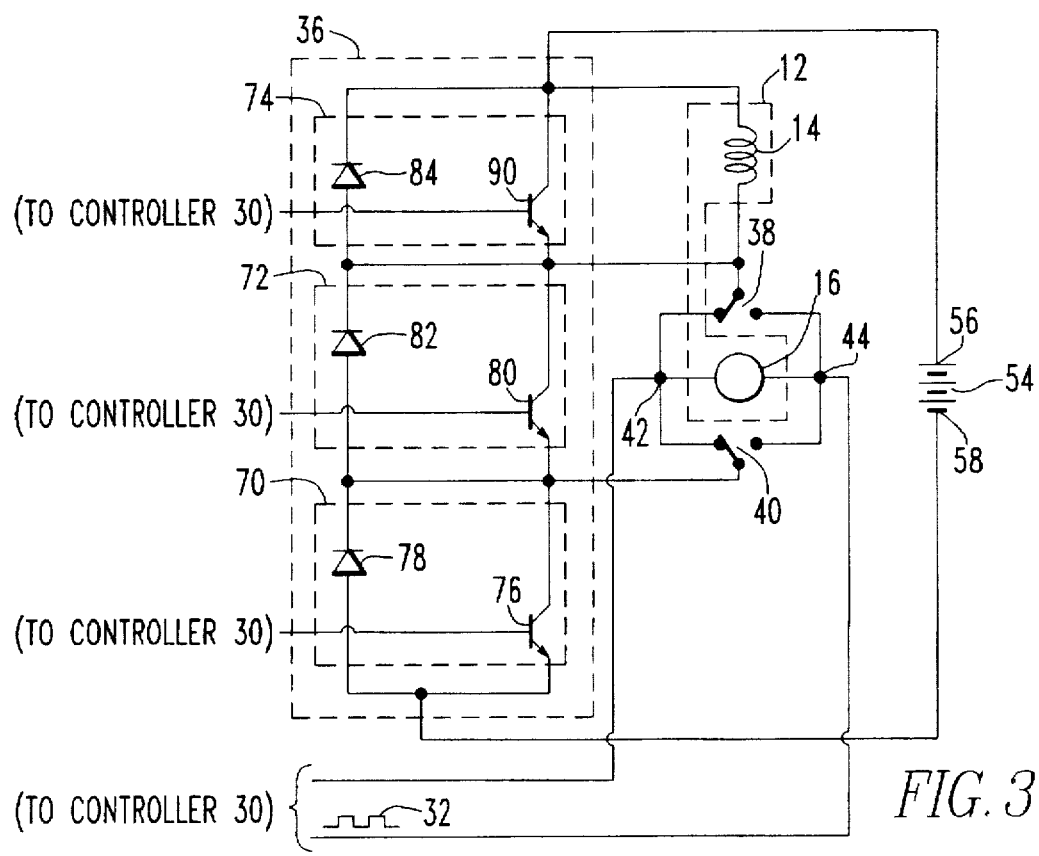
FIG. 3 is a circuit schematic of an alternative embodiment of the power circuit illustrated in FIG. 1, including a bypass transistor for high speed operation.
Figure 4:
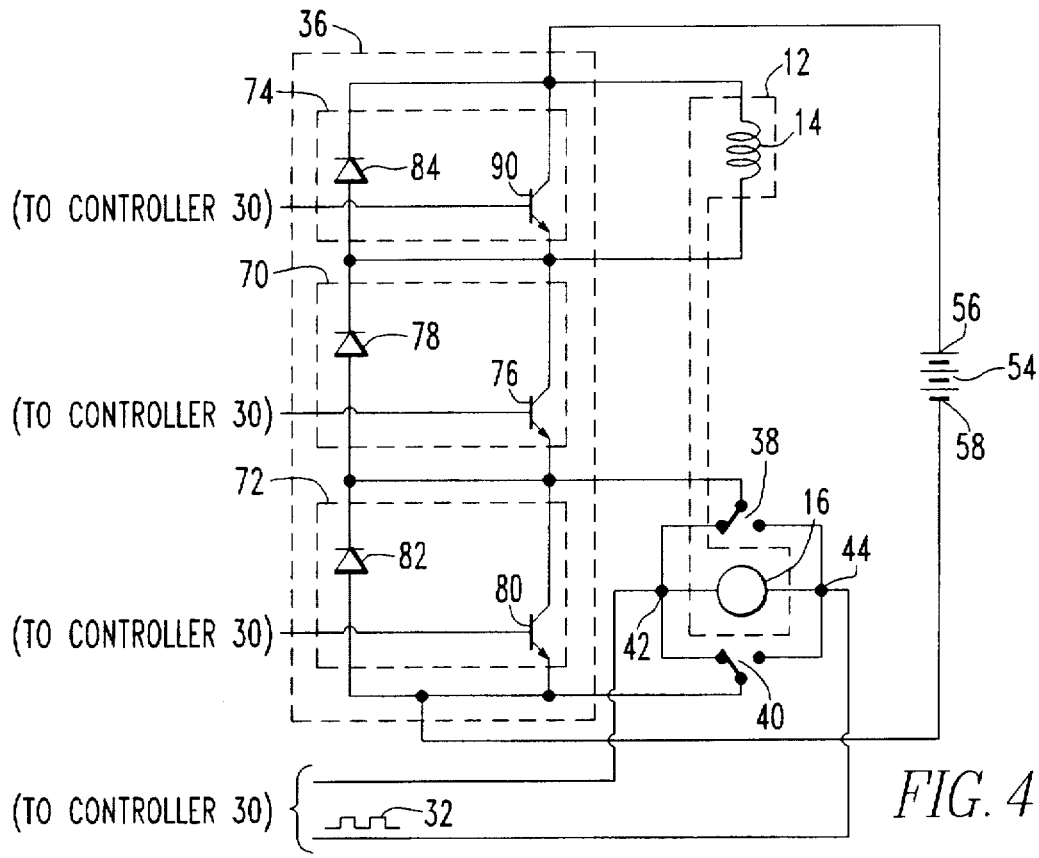
FIGS. 4–8 each illustrate a circuit schematic of an alternative embodiment of the power circuit illustrated in FIG. 1.
Figure 5:
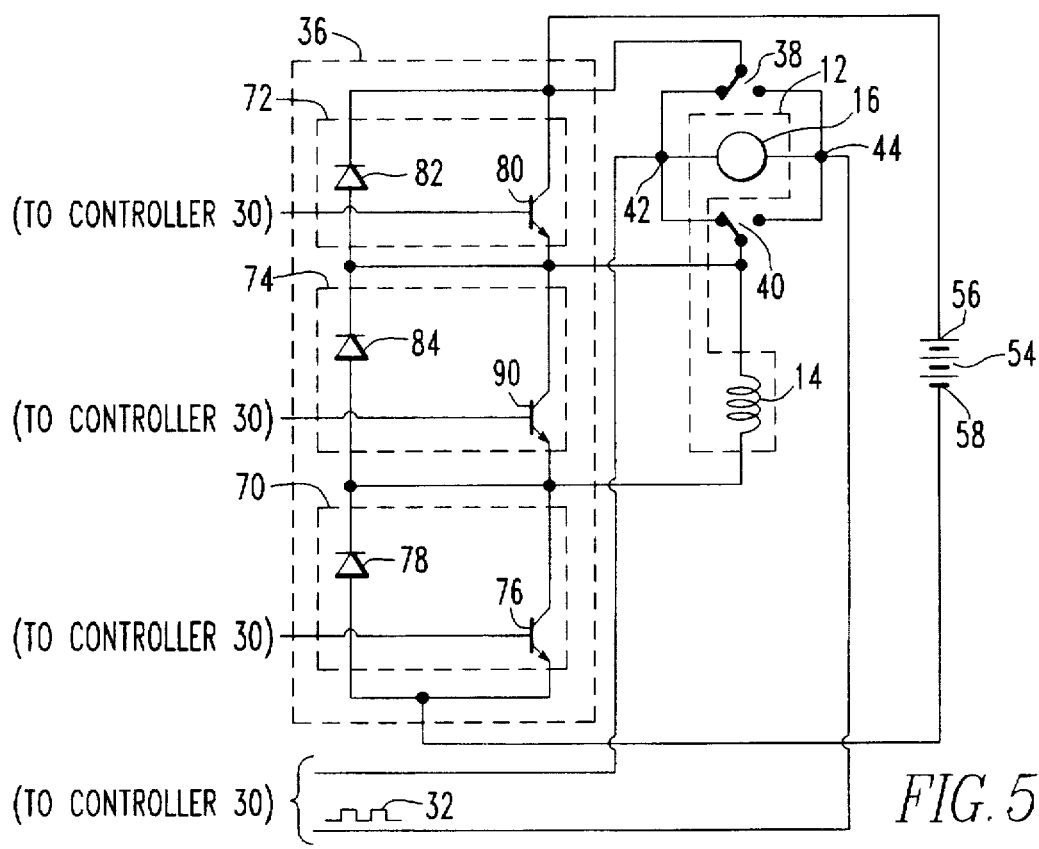
Figure 6:
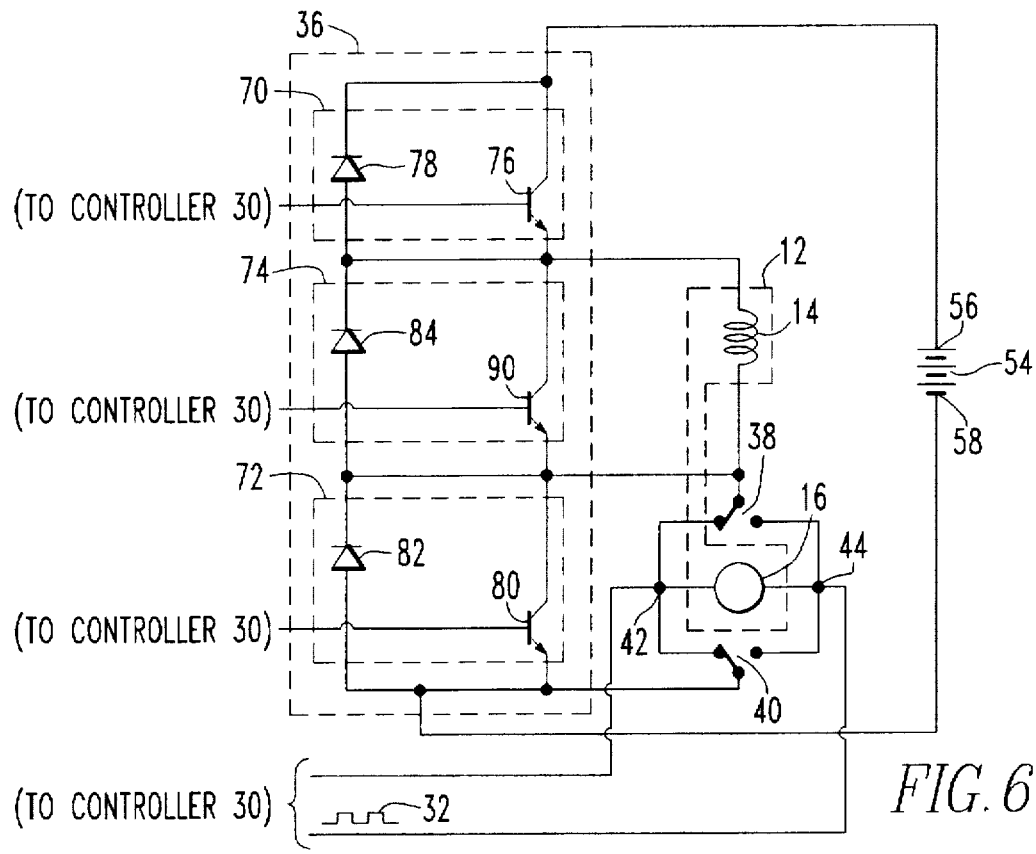
Figure 7:
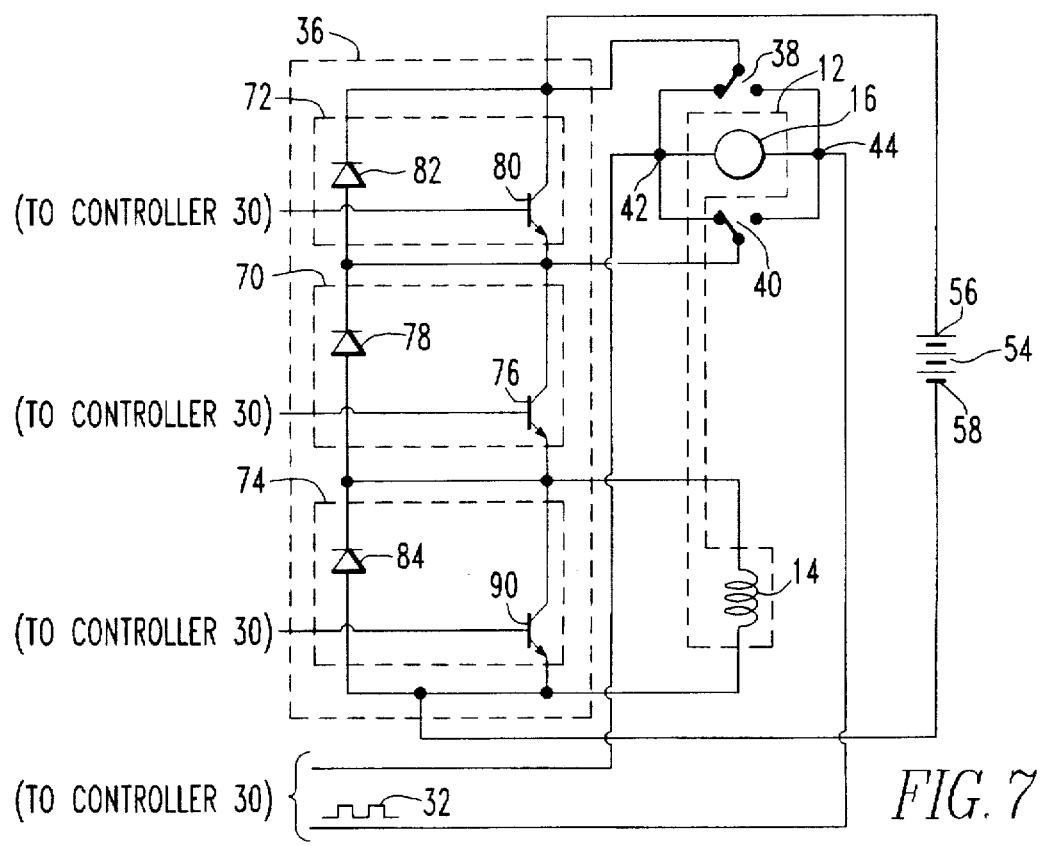
Figure 8:
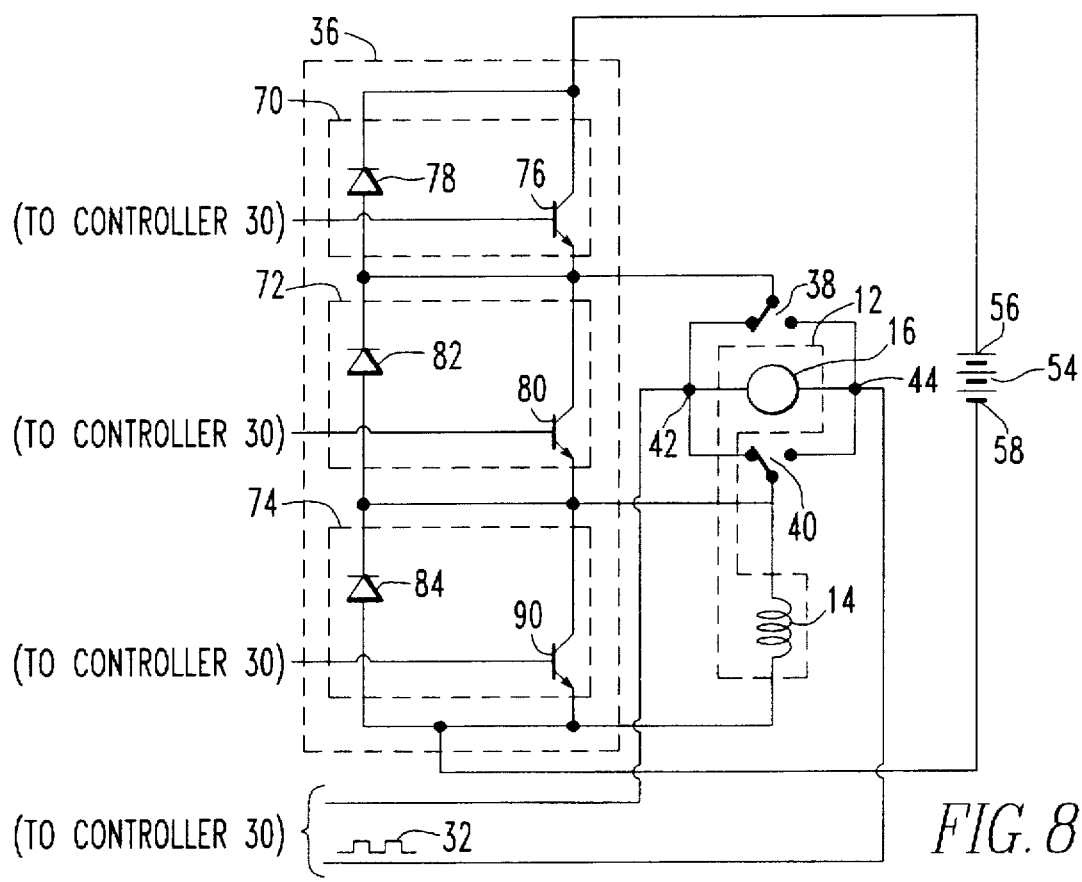

FIG. 3 is a circuit schematic of an alternative embodiment of the power circuit 36 illustrated in FIG. 2. That circuit 36 includes a third switch 90 for high speed operation. The third switch 90 weakens the electromagnetic field generated by the field coil 14, allowing the motor to operate at higher speeds. Preferably the third switch 90 is an IGBT transistor and is controlled by the controller 30 in much the same way that the first and second switches 76, 80 are controlled by the controller 30. Like the first and second switches 76, 80, the third switch 90 may be constructed from other solid state devices, such as GTOs and MCTs.

FIGS. 4, 5, 6, 7, and 8 are schematic diagrams illustrating alternative embodiments of the power circuit 36. In the alternative embodiments, the power circuit 36 retains the same basic structure described hereinabove with respect to FIG. 2. More specifically, each circuit includes the main switching circuit 70, the armature circuit 72, and the field circuit 74. The circuits illustrated in FIGS. 4–8 all include the third transistor 90, although it is not required to realize the advantages of the present invention and it may be omitted.

The power circuit 36 of the present invention is simple, requires few components, and permits the motor 12 to be operated in one or more modes, such as motoring, regenerative braking, and tach. In addition, because the power circuit 36 can operate the field coil 14 and armature 16 in series during motoring and can separately excite the field coil 14 during regenerative braking, it offers the benefits of series-connected motors for motoring and the benefits of separately excited motors for regenerative braking. Furthermore, the present invention is simple enough and small enough to be implemented with series-wound, series-connected direct current motors in underground mining vehicles. The circuit of the present invention also offers the benefit of overspeed protection. That benefit results because the speed of a direct current motor is limited by the voltage across the armature, and the first and third diodes 78, 84 limit the maximum voltage across the armature 16 to be slightly more than the voltage of the battery 54.

The present invention also includes a method of performing regenerative braking with the power circuit 36. The method is described in more detail hereinabove, and it includes the steps of forming a first current path including the positive terminal 56 of the battery 54, the field coil 14, and the negative terminal 58 of the battery 54; disconnecting the first current path; forming a second current path including the field coil 14 and excluding both the armature 16 and the battery 54 for recirculating current flowing through the field coil 14; forming a third current path excluding the battery 54 and the field coil 14 for recirculating current generated by the armature 16; disconnecting the third current path; and forming a fourth current path including the negative terminal 58 of the battery 54, the armature 16, and the positive terminal 56 of the power source 54, and excluding the field coil 14, for providing power to the battery 54 during regenerative braking. The step of disconnecting the first circuit is preferably performed when a predetermined current exists in the field coil 14. Alternatively, the step of disconnecting the first circuit may be performed after a predetermined period of time. The step of disconnecting the third circuit is preferably performed when a predetermined current exists in the armature 16.

Those with ordinary skill in the art will recognize that many modifications and variations of the present invention may be implemented. The foregoing description and the following claims are intended to cover all such modifications and variations.

What is claimed is:

1. A circuit for controlling a motor having an armature and a series-wound, series-connected field coil, comprising:

a main switching circuit including a first switch and a first diode parallel-connected to said first switch;

an armature circuit series-connected to said main switching circuit and including a second switch and a second diode, said second switch is parallel-connected to the armature and said second diode is parallel-connected to said second switch; and a field circuit series-connected to said main switching circuit and said armature circuit and including a third diode parallel-connected to the field coil.

2. The power circuit of claim 1, wherein:

said first switch is a transistor for selectively conducting current flowing through the field coil and armature during motoring;

said second switch is a transistor for selectively conducting current flowing through the armature prior to regenerative braking and for selectively conducting current flowing through the field coil prior to regenerative braking;

said first diode is oriented to conduct current flowing through the armature during regenerative braking;

said second diode is oriented to conduct current flowing through the armature when the armature is disconnected from the power source and in motoring mode;

said third diode is oriented to conduct current flowing through the field coil when the field coil is disconnected from the power source.

3. The power circuit of claim 1, wherein said field circuit further includes a third switch parallel-connected to the field coil.

4. The power circuit of claim 3, wherein said third switch is a transistor oriented to selectively bypass current from the field coil.

5. A method of performing regenerative braking with a motor having an armature and a series-wound, series-connected field coil, and connected to a power source having a positive terminal and a negative terminal, comprising the steps of:

forming a first current path including the positive terminal of the power source, the field coil, and the negative terminal of the power source;

disconnecting the first current path;

forming a second current path including the field coil and excluding both the armature and the power source for recirculating current flowing through the field coil;

forming a third current path excluding the power source and the field coil for recirculating current generated by the armature;

disconnecting the third current path; and forming a fourth current path including the negative terminal of the power source, the armature, and the positive terminal of the power source, and excluding the field coil, for providing power to the power source during regenerative braking.

6. The method of claim 5, wherein the step of disconnecting the first circuit includes disconnecting the first circuit when a predetermined current exists in the field coil.

7. The method of claim 5, wherein the step of disconnecting the first circuit includes disconnecting the first circuit after a predetermined period of time.

8. The method of claim 5, wherein the step of disconnecting the third circuit includes disconnecting the third circuit when a predetermined current exists in the armature.

* * * * *